March 24, 1931. W. A. CLARK 1,797,546
ORNAMENTAL SIDE RING FOR WIRE SPOKED WHEELS
Filed Sept. 30, 1929 2 Sheets-Sheet 1

Inventor:
William A. Clark
by Albert Scheinn
Attorney

March 24, 1931.  W. A. CLARK  1,797,546
ORNAMENTAL SIDE RING FOR WIRE SPOKED WHEELS
Filed Sept. 30, 1929  2 Sheets-Sheet 2
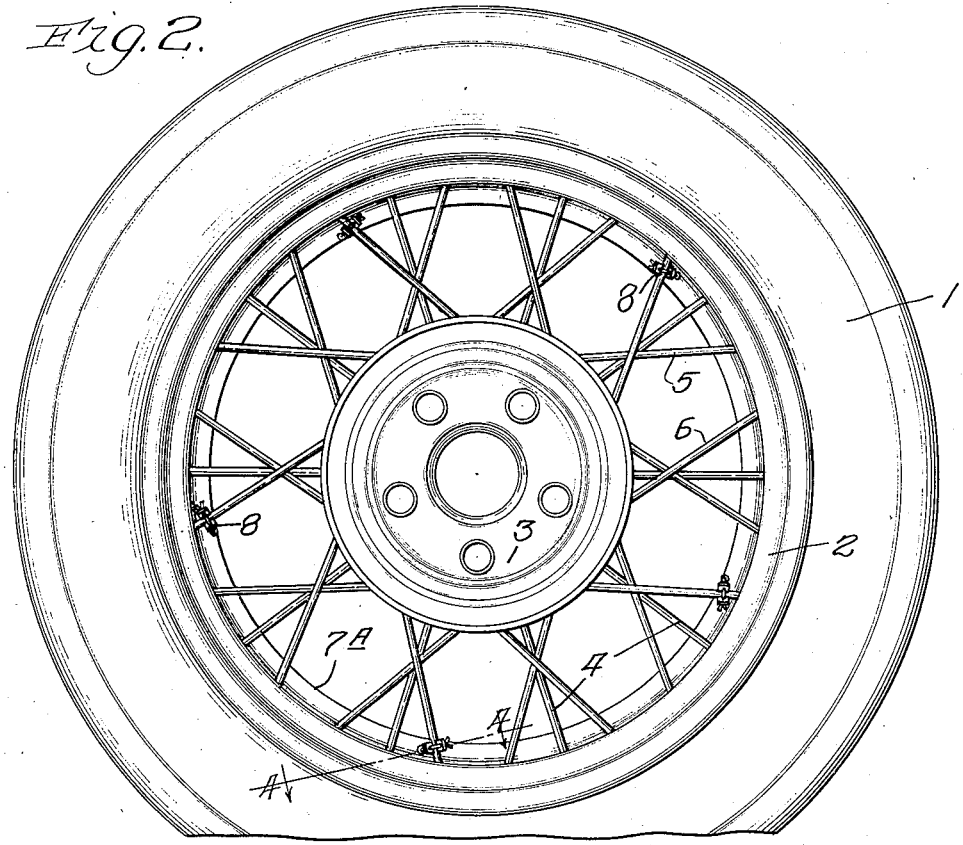
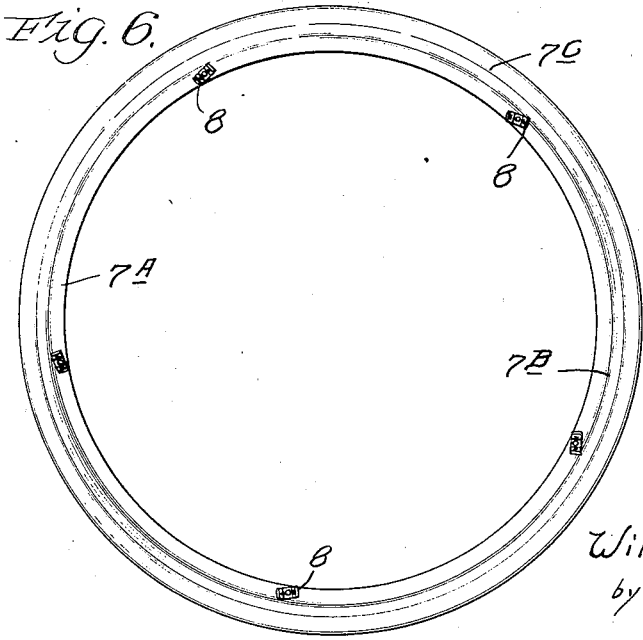
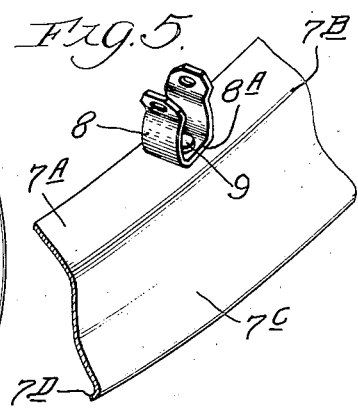
Inventor:
William A. Clark
by Albert Scheibli
Attorney Patented Mar. 24, 1931

1,797,546

UNITED STATES PATENT OFFICE

WILLIAM A. CLARK, OF CHICAGO, ILLINOIS, ASSIGNOR OF ONE-HALF TO LEONARD WESTPHALEN, OF CHICAGO, ILLINOIS

ORNAMENTAL SIDE RING FOR WIRE-SPOKED WHEELS

Application filed September 30, 1929. Serial No. 396,026. REISSUED

My invention relates to means for imparting a highly ornamental appearance to spoked wheels, such as the wire-spoked wheels used on many types of automobiles. Such wheels are generally rather plain, but I have found that I can greatly improve the appearance of each such wheel by attaching an ornamenting ring to the wheel, thereby enhancing the beauty of the entire automobile.

Generally speaking, the object of my invention is that of providing an ornamenting member (desirably of a ring shape) which can readily be affixed to a wheel having wire spokes; which can be attached to the wheel by the use of simple tools and also can easily be detached if that should be necessary; which will be rigid and non-rattling when secured to the wheel; and which can readily be shaped and arranged so as to conform to the size and general design of the rim of any given wheel, and to the spoke arrangement of that wheel.

Furthermore, my invention provides a wheel attachment of this class which can readily be applied to wheels in which some of the spokes do not extend radially of the wheel, which will have its attaching parts adjustable to conform to the angles at which certain spokes of the wheel depart from a radial direction, and which will not interfere with ready access to the air valve for the pneumatic tire on the wheel.

Still further and also more detailed objects will appear from the following specification and from the accompanying drawings, in which Fig. 1 is an exterior side elevation of a wire-spoked wheel provided with a pneumatic tire and equipped with an ornamenting ring attachment embodying my invention.

Fig. 2 is an elevation of the same wheel from the opposite side, with a portion of the tire broken away.

Fig. 3 is a fragmentary and enlarged section, taken along the line 3—3 of Fig. 1 through the wheel rim and my attachment.

Fig. 4 is a fragmentary section taken along the line 4—4 of Fig. 2.

Fig. 5 is an enlarged perspective view of a portion of my ornamenting ring, which portion includes one of the attaching clips as it appears before the ring is attached to the wheel.

Fig. 6 is an elevation of my wheel attachment alone, taken from the same side as Fig. 2 (namely, the inner side of the wheel), showing the main portions of this attachment before it is applied to the wheel.

Figure 1:
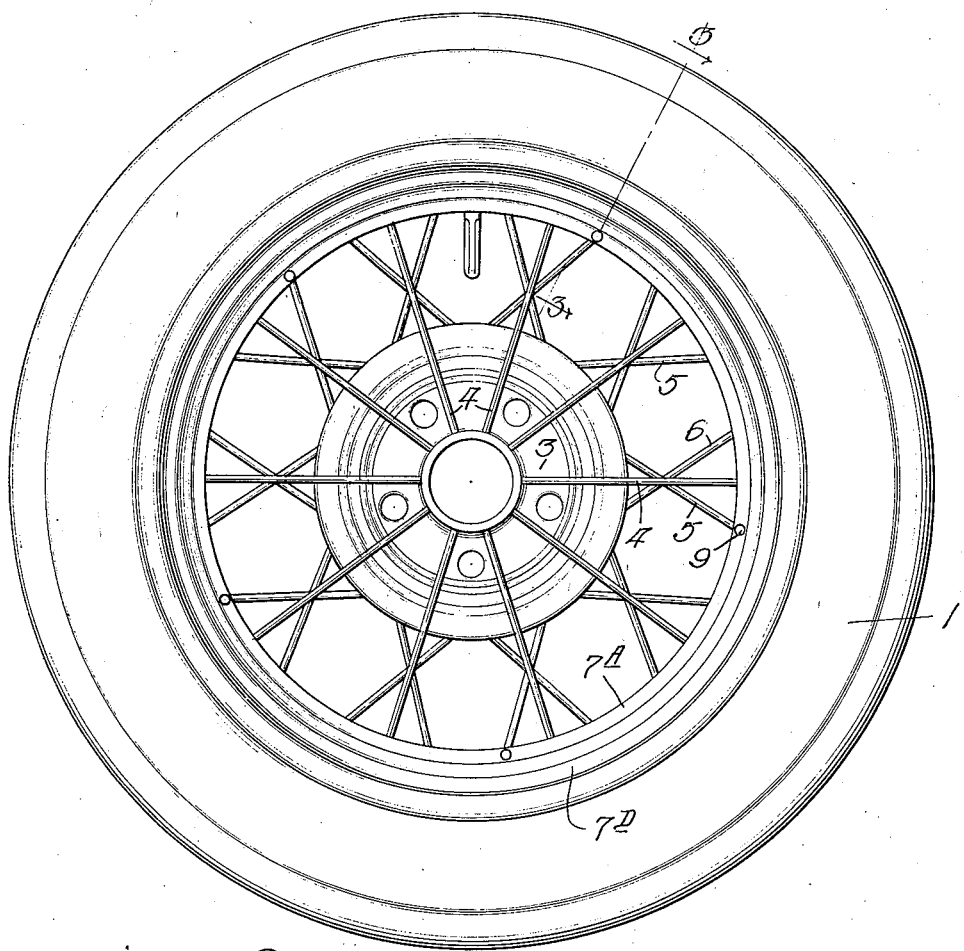
Figure 1:
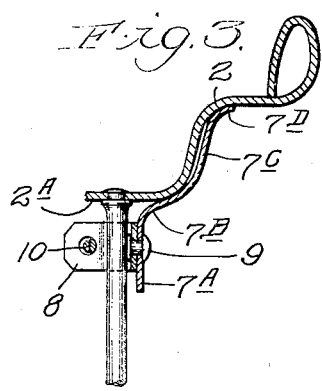
Figure 1:
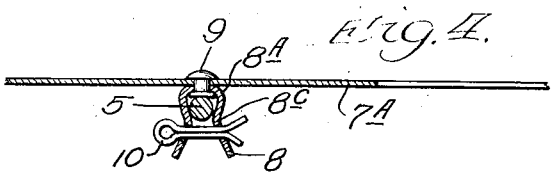

In the drawings, Figs. 1 and 2 respectively show the outer and inner faces of an automobile wheel which includes a pneumatic tire 1 mounted in a wheel rim 2 (of which rim Fig. 3 shows a partial section) and a hub 3. This hub is connected to the rim by three groups of wire spokes, namely radial spokes 4, eccentric spokes 5 extending laterally inward of the wheel from the said radial spokes, and eccentric spokes 6 extending between the spokes of the two aforesaid groups and crossing the previously named eccentric spokes 5.

To beautify such a wheel, I provide an annular ornamenting ring 7 (desirably punched, spun or rolled from sheet metal) which ring is so formed in radial cross-section (as shown in Fig. 3) that its radially outward part will bear against laterally outward face portions of the wheel rim 2, while its radially inward portion 7 A is disposed within the said wheel rim and desirably extends in a plane at right angles to the axis of the wheel. These ring portions are desirably connected by a bent portion 7 B which fits the inner laterally extending surface of the rim, so that the ornamenting ring will be centered on the rim both by the interfitting of the bent portion 7 C with the similarly formed outer face portion of the rim, and by the bearing of the outwardly curved radially outer portion 7 D of the ring against an adjacent part of the wheel rim. Moreover, I form the ornamenting ring so that, when it thus engages the rim of the wheel, its radially inward portion 7 A is disposed laterally outward of all spokes of the wheel.

I provide my ornamenting ring with attaching members mounted on the said radially inward portion 7 A and spaced to correspond to the spacing between radially outer portions of spokes of one of the said groups, as for example those portions of the alternate spokes 5. Each such attaching member desirably includes a substantially U-shaped metal clip 8 which has its back 8 A secured to the ornamenting ring by a rivet 9 and which has its arms initially spread farther apart than the diameter of the spoke 5 which is to be straddled by this clip. Since the arrangement of the spokes varies in different wheels, so that spokes of any one of several differently extending groups may be positioned for convenient attaching to the ornamenting ring, I preferably leave each clip 8 sufficiently loose on its supporting rivet 9 to permit the clip to be rotated about the axis of the rivet; thereby allowing the clip arms to extend for example, in the same direction (edgewise of these arms) as any one of the three differently directed spokes 4, 5 and 6 in Fig. 1.

I also preferably form each clip arm intermediate of its ends with a bend 8 C disposed at a greater distance from the adjacent head of the rivet 9 than the diameter of the spoke which is straddled by the clip, so that the arm portions of the clip which are adjacent to the base of the clip can be bent toward each other to partly encircle the spoke, as shown in Fig. 4. Thus arranged, and with each clip formed of resilient metal, these clips will grip the adjacent spokes to hold the ornamenting ring against the wheel rim.

However, I preferably also supplement this spring-gripping by inserting a retaining element, such as a cotter pin 10 through alined holes in the arms of each clip and bending the free ends of the cotter pin (as shown in Fig. 4) to form positive means for preventing the clip arms from spreading apart. Indeed, the cotter pin may even engage the adjacent spoke (although not so shown in the drawing), although the spoke may be free of engagement either with the head of the adjacent rivet 9 or with the cotter pin.

With the ornamenting ring suitably proportioned as to the extent to which its radially inner part extends into the bore of the rim toward the spokes, and with the attaching clips suitably spaced according to the arrangement of the spokes in the wheel, my attaching ring with its clips suitably turned (as in Fig. 6) can instantly be slipped into position, so that each clip straddles an adjacent spoke.

Then each clip can readily be squeezed with pliers to approach its arms into gripping relation to the spoke straddled by it; or, if the clip is sufficiently resilient, the initial wider spreading and subsequent contraction will not even be needed, as the clip will snap over the spoke. The affixing of the spring cotters or other positive clamping elements is also quickly done, so that the entire attaching of one of my wheel ornaments requires very little time and only a simple tool.

Since the attached ornament does not bear against any spoke, my attachment will not produce any undesirable squeaking when in use. And, since the attaching clips can be disposed close to the outer ends of the spokes, these clips will allow for the slight change of direction in the spokes which may come with each rotation of the wheel when used on a heavily loaded car. Consequently, my attachment is noiseless when in use. So also, by pivotally mounting the attaching clips on the ornamenting ring, I can employ the same assembly on different wheels, provided that the number and spacing of the selected outer ends of the spoke ends is the same.

However, while I have pictured and described my wheel ornament as attached to eccentrically disposed spokes, I do not wish to be limited in this respect; nor to the radial width of the ornamenting ring, which ring obviously may extend much further radially inward of the wheel. Furthermore, I do not wish to be limited as to the radial cross-section of my wheel ornament, which may be varied in many ways even for use in connection with the same wheel rim. Indeed, it is to be understood that many changes might be made without departing either from the spirit of my invention or from the appended claims, so that I do not wish to be limited to the details of the construction and arrangement above recited.

I claim as my invention:

1. An ornament for a wheel having wire spokes, comprising a ring-shaped metal member bearing laterally against the outer face of the rim of the wheel and extending radially inward of the wheel adjacent to certain of the spokes for a minor fraction of the length of the spokes, and plural attaching means carried by the said member adjacent to the said rim and each effectively embracing one of the said adjacent spokes.

2. An ornament for a wheel having wire spokes within a rim, comprising a ring-shaped metal punching considerably narrower than the length of the spokes having its radially outer portion formed to fit against the lateral outer face of the wheel rim and having a radially more inward portion disposed within said rim; attaching clips carried by and extending laterally inward of the wheel from the said punching, each clip straddling one spoke of the wheel, and auxiliary means extending through each clip laterally inward of and adjacent to the spoke straddled by that clip.

3. An ornamental attachment for a wheel including a tubular rim portion to which the outer ends of wire spokes are attached, which portion forms part of a rim presenting an S-shaped contour radially of the wheel, comprising a sheet metal ring formed to conform substantially to the said contour and having its radially inner portion extending substantially parallel to and outwardly of spokes of the wheel, and clips mounted on the said radially inner portion adjacent to the tubular rim portion and gripping the adjacent spokes.

Signed at Chicago, Illinois, September 25th, 1929.

WILLIAM A. CLARK.